US008694761B2

(12) United States Patent
Zimmer et al.

(10) Patent No.: US 8,694,761 B2
(45) Date of Patent: Apr. 8, 2014

(54) SYSTEM AND METHOD TO SECURE BOOT BOTH UEFI AND LEGACY OPTION ROM'S WITH COMMON POLICY ENGINE

(76) Inventors: Vincent Zimmer, Federal Way, WA (US); Mohan Kumar, Aloha, OR (US); Mahesh Natu, Portland, OR (US); Jiewen Yao, Shanghai (CN); Qin Long, Shanghai (CN); Liang Cui, Shanghai (CN)

( * ) Notice: Subject to any disclaimer, the term of this patent is extended or adjusted under 35 U.S.C. 154(b) by 889 days.

(21) Appl. No.: 12/347,834

(22) Filed: Dec. 31, 2008

(65) Prior Publication Data

US 2010/0169633 A1 Jul. 1, 2010

(51) Int. Cl.
*G06F 9/00* (2006.01)

(52) U.S. Cl.
USPC .................. 713/1; 713/2; 713/189; 713/193

(58) Field of Classification Search
USPC ................ 713/1, 2, 100, 187, 188, 189, 193
See application file for complete search history.

(56) References Cited

U.S. PATENT DOCUMENTS

| | | | |
|---|---|---|---|
| 5,421,006 A | 5/1995 | Jablon et al. | |
| 5,919,257 A | 7/1999 | Trostle | |
| 6,401,208 B2 * | 6/2002 | Davis et al. | 713/193 |
| 6,463,535 B1 * | 10/2002 | Drews | 713/176 |
| 6,560,706 B1 * | 5/2003 | Carbajal et al. | 713/155 |
| 7,089,433 B2 | 8/2006 | Chaiken et al. | |
| 7,127,579 B2 | 10/2006 | Zimmer et al. | |
| 7,539,868 B2 | 5/2009 | Balard et al. | |
| 2006/0005000 A1 * | 1/2006 | King et al. | 713/1 |
| 2006/0101310 A1 | 5/2006 | Diamant et al. | |
| 2006/0200682 A1 | 9/2006 | Hars et al. | |
| 2007/0033315 A1 | 2/2007 | Nguyen et al. | |
| 2007/0079112 A1 * | 4/2007 | Lewis et al. | 713/2 |
| 2008/0256363 A1 | 10/2008 | Balacheff et al. | |
| 2009/0094421 A1 | 4/2009 | Lewis | |
| 2009/0172639 A1 | 7/2009 | Natu et al. | |
| 2009/0210689 A1 * | 8/2009 | Harmer | 713/2 |
| 2010/0017796 A1 * | 1/2010 | Walker et al. | 717/174 |

OTHER PUBLICATIONS

Non Final Office Action Received for the U.S. Appl. No. 11/965,295, mailed on Jun. 9, 2011, 24 pages.
Non Final Office Action Received for the U.S. Appl. No. 11/965,295, mailed on Mar. 28, 2013.

* cited by examiner

*Primary Examiner* — Paul Yanchus, III
(74) *Attorney, Agent, or Firm* — Grossman, Tucker, Perreault, Pfleger, PLLC (57) ABSTRACT

In some embodiments, the invention involves using a policy engine during boot, in the driver execution environment (DXE) phases to authenticate that drivers and executable images to be loaded are authenticated. Images to be authenticated include the operating system (OS) loader. The policy engine utilizes a certificate database to hold valid certificates for third party images, according to platform policy. Images that are not authenticated are not loaded at boot time. Other embodiments are described and claimed.

24 Claims, 7 Drawing Sheets

1 – Measured Boot
2 – Secure Boot
3 – FIT Boot

Fig. 1

```
201  Foreach UEFI Image (

203  LoadImage()

205  If (IsImageAuthorized()) {
207      MeasureImage()
209      StartImage()
     }
     )

211  Foreach option ROM (

213  CopyROMfromBAR ()

215  If (IsOpROMAuthorized()) {
217      MeasureLegacyROM()
219      Store LegacyROM image to
                PCI_IO_PROTOCOL.ImageBase
     } else {
                PCI_IO_PROTOCOL.ImageBase = NULL
         }

CSM Thunk driver, platform BDS, or
220  platform LegacyBios:
         LegacyBios->InstallPciRom ()
         If (PCI_IO_PROTOCOL.ImageBase != NULL) {
                LegacyBIOS->FarCall (RomEntry+3)
     }
     )
```

```
Typedef struct _EFI_CERTIFICATE_DATABASE {
  UINT32      DatabaseSize;
  UINT32      CertificateListCount;
  UINT8       CertificateListData[ANYSIZE];
} EFI_CERTIFICATE_DATABASE;

typedef struct _EFI_CERTIFICATE_LIST {
  UINT32      CertificateListSize;
  UINT32      CertificateCount;

EFI_GUID    CertificateType;
  UINT32      CertificateHeaderSize;
  UINT32      CertificateSize;

// UINT8     CertificateHeader[CertificateHeaderSize];
  // UINT8     Certificates[…][CertificateSize];
} EFI_CERTIFICATE_LIST;

Typedef struct _EFI_CERTIFICATE_DATA {
  EFI_GUID    ID;
  UINT8       Data[ANYSIZE];
} EFI_CERTIFICATE_DATA;
```

SYSTEM AND METHOD TO SECURE BOOT BOTH UEFI AND LEGACY OPTION ROM'S WITH COMMON POLICY ENGINE

FIELD OF THE INVENTION

An embodiment of the present invention relates generally to booting a platform and, more specifically, to protecting against malware in third party drivers and executables using a policy engine to ensure that the images are authenticated.

BACKGROUND INFORMATION

Various mechanisms exist for checking platform status. In some existing systems, the Trusted Platform Module (TPM) and the techniques promulgated by the Trusted Computing Group entail the use of the TPM as a Root-of-Trust for Storage (RTS) and Reporting (RTR) via the Platform Configuration Registers (PCR's) and Storage Root Key (SRK), respectively. More information can be found on the public Internet at URL www*trustedcomputinggroup*org, where periods in the URLs are replaced with asterisks to avoid inadvertent hyperlinks.

The TPM is a passive piece of hardware. The platform firmware (or microcode) is the Root of Trust for Measurement (RTM). The unified extensible firmware interface (UEFI) Secure Boot adds a Root of Trust for Enforcement of Validation (RTE/RTV), which enables the "Secure Boot." However, the TPM merely records the status, and on its own does not provide a method for ensuring boot integrity.

Currently, there is only standardization of measured boot, e.g., record but run the image regardless of the status. This scheme is akin to auditing from a security perspective, rather than protection. From a product perspective, it may be acceptable, because a challenger can assess the security posture. However, from a malware perspective, this scheme is unacceptable since the malware was "measured and run." Once the malware runs, even if it is later detectable, the damage has been done. Thus, there is a need to proactively prohibit the execution of unauthorized code.

BRIEF DESCRIPTION OF THE DRAWINGS

The features and advantages of the present invention will become apparent from the following detailed description of the present invention in which.

DETAILED DESCRIPTION

In at least one embodiment of the invention a system policy engine is used in conjunction with status returned from the Trusted Platform Module (TPM) coupled to the platform to ensure that no malware or unauthorized modification to the system have been introduced.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Embodiments of the invention add a capability for a platform owner to ensure that the firmware is only executed if it is owner-authorized, such by utilizing signed components. Whereas RTM (Root of Trust for Measurement) will record state and continue execution regardless of the measurement, an RTE and "Secure Boot" will stop the boot if the software state does not meet a predefined integrity metric, such as a hash in a white-list or a digital signature. UEFI enables both cases but advocates the latter since the list of possible hashes is an unbounded, management nightmare; public keys allow for a level of indirection to map the keys to a few trusted sources, thus easing the management problems associated with deployment. The problems being addressed include having a single policy mechanism to authorize the execution of 3rd party UEFI drivers and legacy option ROM's.

UEFI is a standard, but the use of UEFI Platform Initialization (PI) firmware, such as PEI (pre-EFI initialization) and DXE (driver execution environment), will allow for locking down the pre-operating system (OS) execution environment. Many platform vendors may take advantage of the UEFI standard, but platforms based upon embodiments of the invention disclosed herein can support both legacy and UEFI enabled platforms.

Figure 1:
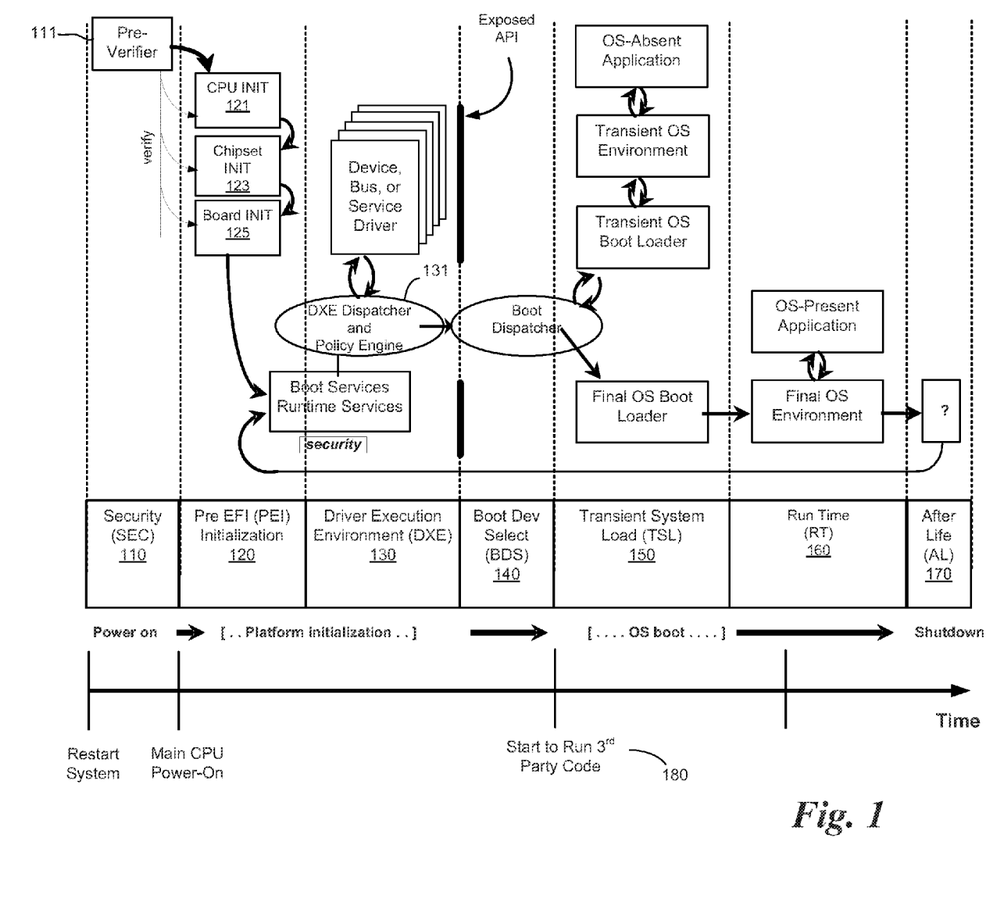
FIG. 1 is a block diagram illustrating the flow of execution of a system according to an embodiment of the invention.

FIG. 1 illustrates the flow of execution of a system according to an embodiment of the invention. A pre-verifier 111 may be run at power-on and the security (SEC) phase 110. A pre-verifier is typically another AC (authenticated code) module that initializes and checks the environment. In existing systems, the pre-verifier and SEC phase is the Core Root of Trust for Measurement (CRTM), namely enough code to startup the Trusted Platform Module (TPM) and perform a hash-extend of BIOS.

The processor 121, chipset 123 and board 125 may be initialized (launched by SEC) in the pre-EFI initialization (PEI) stage 120. After PEI, the EFI Driver Dispatcher and Intrinsic Services are launched securely in the driver execution environment (DXE) 130. The operations at the PEI phase 120 may be run from CRAM (cached as RAM) before EXI-TAC to driver execution environment (DXE) 130. The OS boots at the transient system load (TDL) stage 150.

The boot device select (BDS) phase 140 is responsible for choosing the appropriate operating system. Upon a system failure during OS runtime (RT phase 160), such as what is referred to as BSOD (Blue Screen Of Death) in Windows® or Panic in Unix/Linux, the firmware PEI and DXE flows may be reconstituted in an after life (AL phase 170) in order to allow OS-absent recovery activities.

Third party drivers and code may begin to be run (executed) at 180, after the BDS 140 phase. It is crucial that the $3^{rd}$ party code is protected from malware. The TPM will only provide the status, and not protect the system, on its own. In an embodiment, a policy engine runs in the DXE dispatcher 131 in the DXE phase 130 to ensure that the $3^{rd}$ party code is authorized before the $3^{rd}$ party code is launched at 180.

Figure 2:
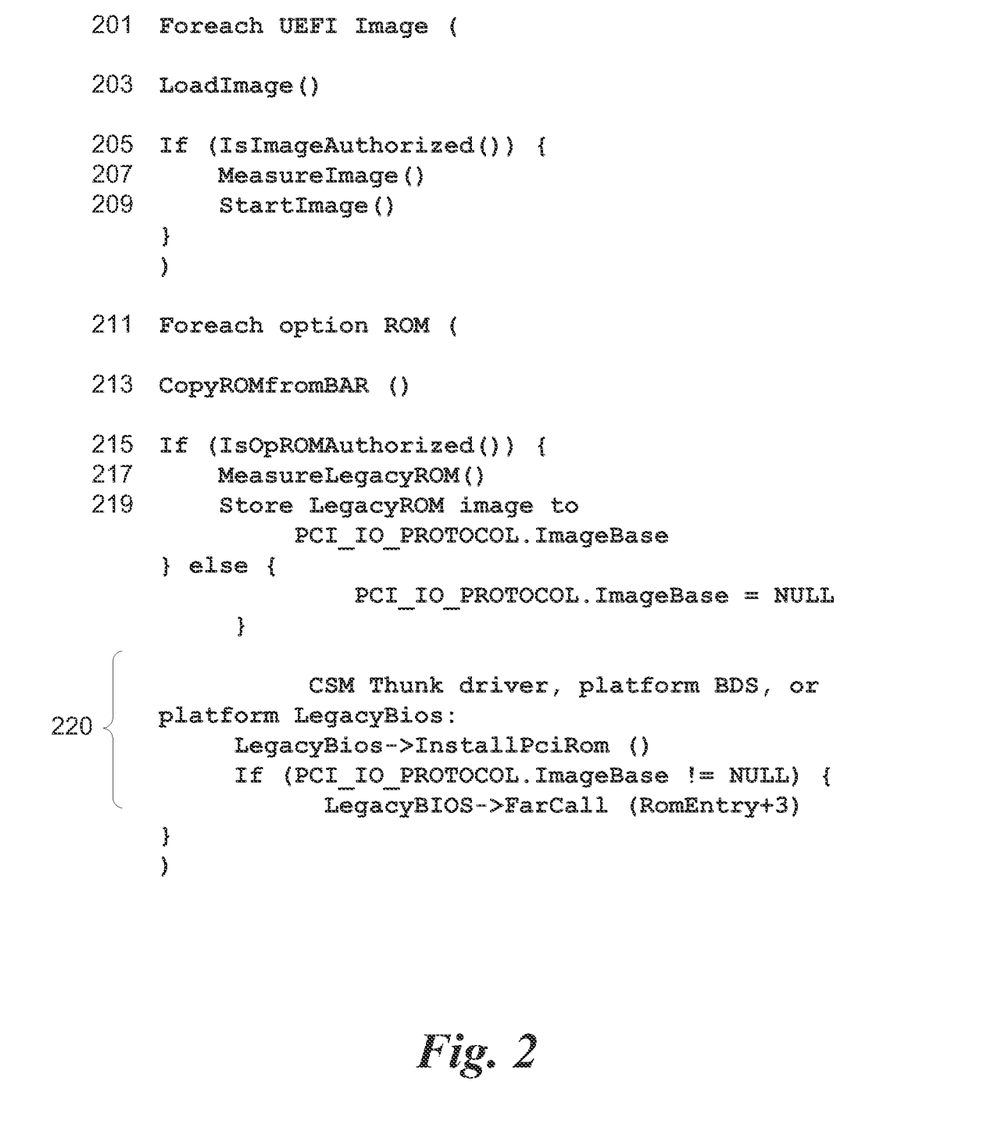
FIG. 2 shows pseudo-code that may be used b a policy engine in embodiments of the disclosed invention to ensure that images are authorized before being loaded or launched.

FIG. 2 shows pseudo-code that may be used in embodiments of the disclosed invention to ensure that images are authorized before being loaded or launched. Each UEFI image to be loaded must be authorized to protect from malware in line 201. Each image is loaded with the LoadImage( ) function in line 203. This function checks to see if the image is authorized with a IsImageAuthorized( ) function in line 205. In an embodiment, the IsImageAuthorized( ) function utilizes a digital signature in the image, and uses the policy engine to ensure that the signature matches a valid signature in a certificate database. If the image is authorized, a measurement is taken with MeasureImage( ) in line 207. The TPM measures the image to calculate a hash value for the image and loads the hash into a TPM register, platform configuration register. This measurement may be used to ensure that the image is not modified in an unauthorized manner. The image may then be launched with StartImage( ) in line 209.

A similar method is used to verify that legacy Option ROMs are authorized in line 211. Each Option ROM is copied from the base address register (BAR) at line 213, CopyROMfromBAR) function. A function IsOpROMAuthorized( ) is performed in line 215 to determine whether the Option ROM is authorized. If the Option ROM is authorized, a measurement is taken with MeasureLegacyROM( ) by the TPM in line 217 and then the Legacy Option ROM image is stored with StoreLegacyROM image to the PCI_JO_PROTOCOL.ImageBase, e.g., the memory address where the Option ROM is loaded is recorded into the PCI image base global variable, in line 219. The Option ROM is installed at 220.

When an image or Option ROM fails authentication, or the measurement shows an unauthorized modification, the image is not loaded or launched. Thus, the system is protected from possible malware.

Figure 3:
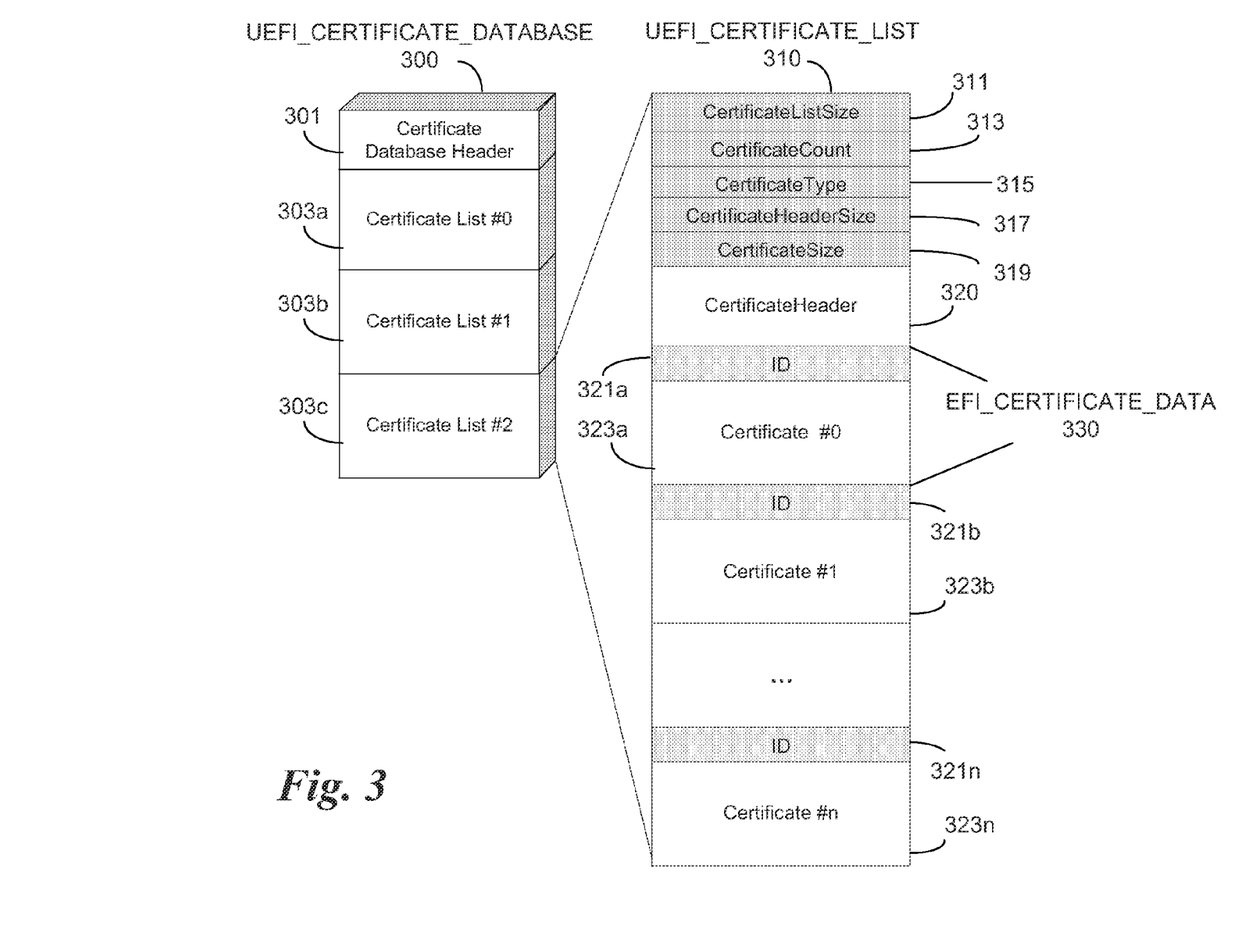
FIG. 3 is a block diagram illustrating an exemplary structure of the certificate database, according to an embodiment of the invention.

FIG. 3 illustrates the structure of the UEFI certificate database 300, according to an embodiment of the invention. The general structure of the database is shown on the left with a header 301, and three certificate lists 303*a-c*. A certificate list 310 is shown on the right, with a list size 311, certificate count 313, type 315, header size 317, certificate size 319, certificate header 320, and each certificate 330 having an identifier 321*a-n* and data 323*a-n*.

The certificate database 300 may be used by the policy engine to verify that images and Option ROMs are authorized. Images that authorized to run on a platform will have an associated certificate in the database. In an embodiment, an image to be loaded has an embedded digital signature to be checked against the database. Thus, the return value of the IsImageAuthorized( ) function, for instance, is based on the database element. If a valid public key is found in the database associated with the image identifier, then the image signature can be verified and loaded.

Figure 3A:
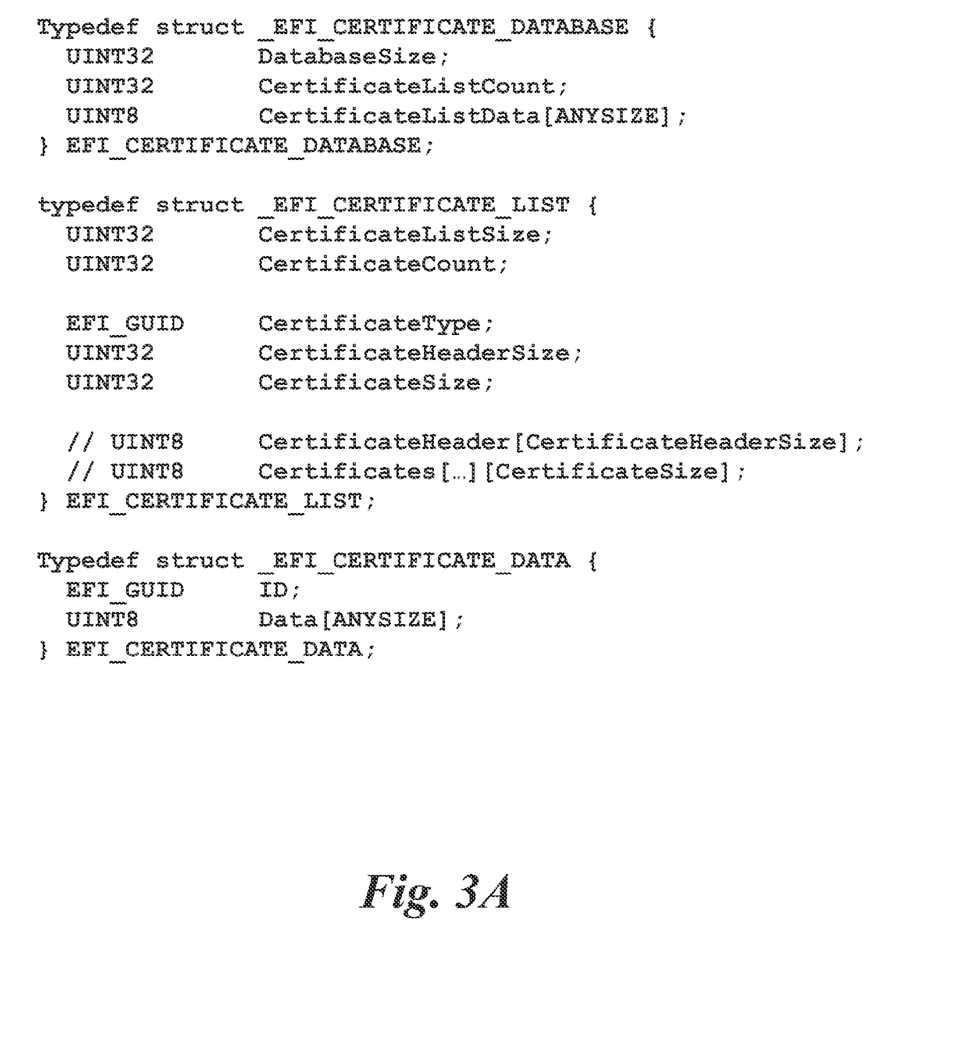
FIG. 3A shows an exemplary structure definition for a certificate database used in conjunction with the policy engine, according to an embodiment of the invention.

FIG. 2A shows an exemplary structure definition for a certificate database used in conjunction with the policy engine, according to an embodiment of the invention. In an embodiment, an EFI Certificate database is implemented b defining structures for its elements. A database structure, EFI_CERTIFICATE_DATABASE may contain a field 32 bit integer field for the database size, a 32 bit integer field for a count of certificates, and an 8 bit integer field array to hold the certificate list data. The certificate list, EFI_CERTIFICATE_LIST, may contain integer fields for a list size, certificate count, certificate header size and certificate size; a globally unique identifier (GUID) field for the certificate type; and integer arrays for a certificate header and certificates (signatures). The certificate data may be defined as a structure having a GUID field for the identifier, and an integer array for data. It will be apparent to one of skill in the art that various structures for the certificate database may be used.

Figure 4:
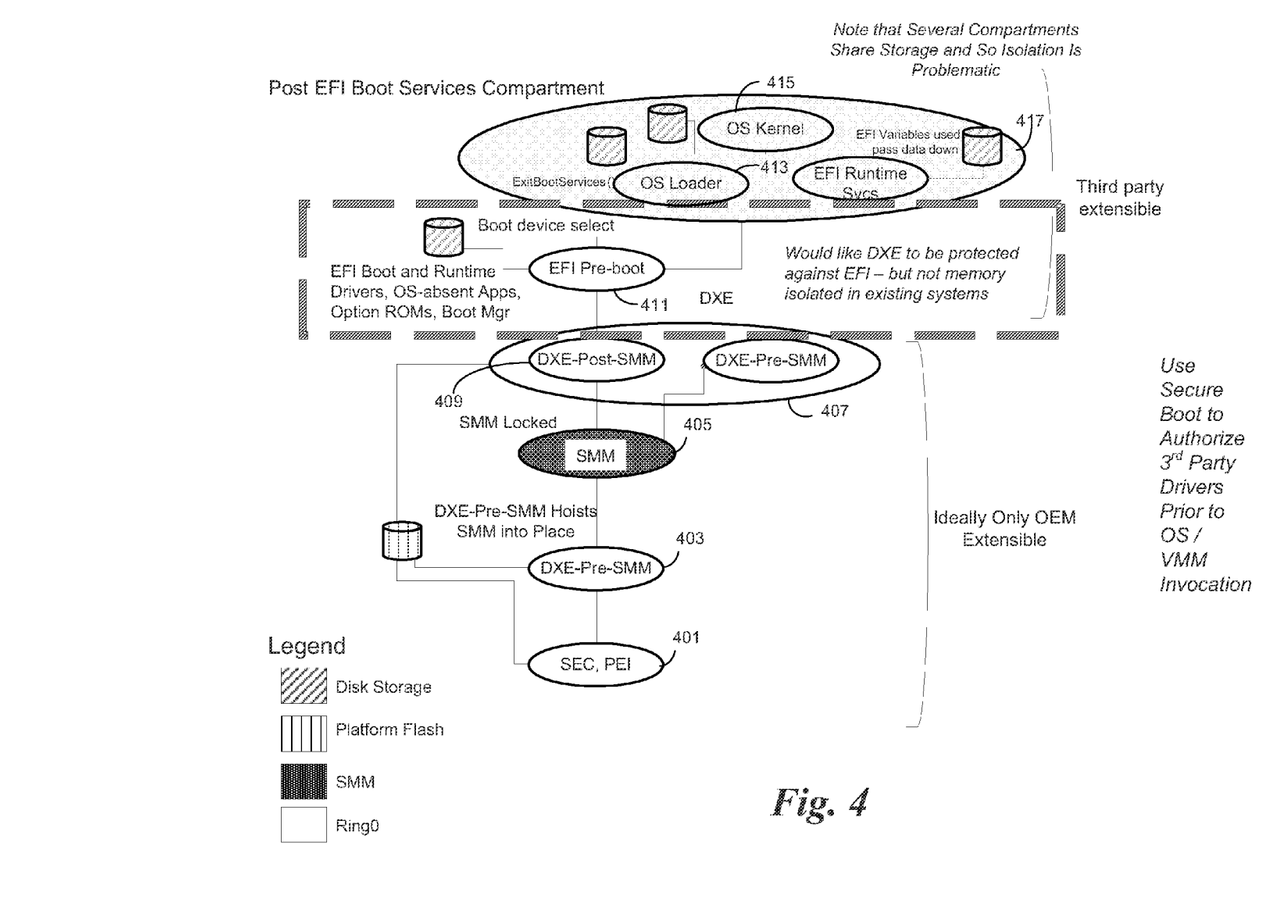
FIG. 4 is a block diagram illustrating boot process flow and structural constructs of a platform, according to an embodiment of the invention.

Referring now to FIG. 4, there is shown a block diagram illustrating boot process flow and structural constructs of a platform, according to an embodiment of the invention. Oval 401 depicts the SEC 110 and PEI 120 phases of platform boot, as shown in FIG. 1. The DXE phase 130 is shown in more detail at 403, 405 and 407. Oval 403 depicts the DXE phase prior to system management mode (SMM) 405 launch. The SMM is launched at oval 405. DXE phase completes at 407. The SEC, PEI 301 and DXE images may be stored on the platform Flash memory 410. In an embodiment of the invention, a policy engine runs in the post-DXE phase 409. Only authorized images and Option ROMs will be loaded and launched in this phase. Once the authorized images are loaded, the platform boot may continue to EFI pre-boot 411 and launch the runtime drivers, OS-absent applications, Option ROMs and boot manager. Boot can then continue with the OS loader 413 and OS kernel 415, along with the loaded EFI runtime services 417.

Figure 5:
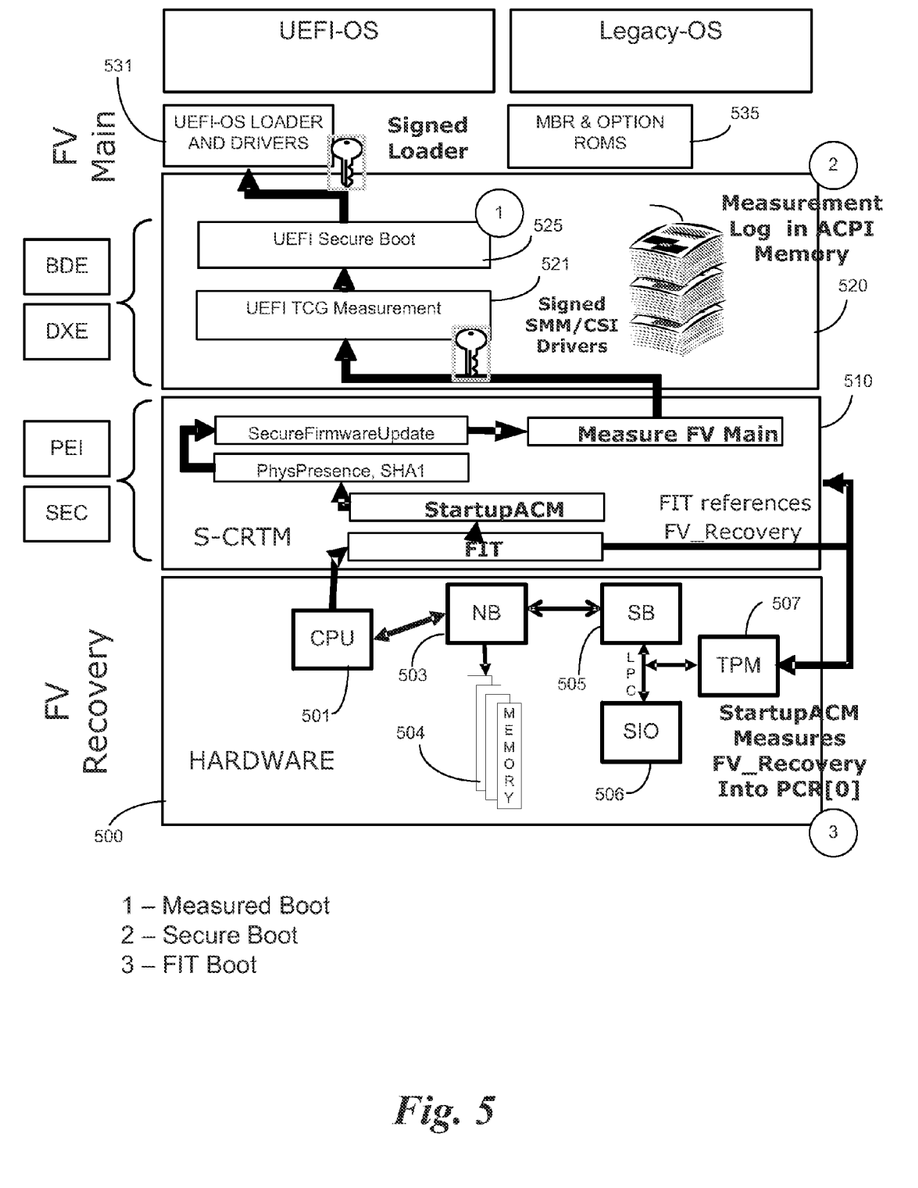
FIG. 5 is a block diagram showing a hardware and firmware layered view of the boot process, according to an embodiment of the invention.

FIG. 5 is a block diagram showing a more hardware and firmware layered view of the boot process, according to an embodiment of the invention. In an embodiment of the invention, processor 501 may communicate with a memory controller hub (MCH) 503, also known as North bridge (NB), via the front side bus. The NB 503 communicates with system memory 504 via a memory bus. The NB 503 may also communicate with an advanced graphics port (AGP) via a graphics bus (not shown). The NB 503 may communicate with an I/O controller hub (ICH) 505, also known as South bridge (SB), via a peripheral component interconnect (PCI) bus. The SB 505 may be coupled to one or more components such as PCI slots (not shown), integrated I/O components such as IDE, USB, LAN and Audio (not shown), and a Super I/O (SIO) controller 506 via a low pin count (LPC) bus for legacy devices like parallel and serial ports.

Processor 501 may be any type of processor capable of executing software, such as a microprocessor, digital signal processor, microcontroller, or the like. Though FIG. 5 shows only one such processor 501, there may be one or more processors in platform hardware 500 and one or more of the processors may include multiple threads, multiple cores, or the like.

Memory 504 may be a hard disk, a floppy disk, random access memory (RAM), read only memory (ROM), flash memory, or any other type of medium readable by processor 501. Memory 504 may store instructions for performing the execution of method embodiments of the present invention.

Non-volatile memory, such as Flash memory (FIG. 4, 410), may be coupled to the IO controller via a low pin count (LPC) bus, as well. The BIOS firmware typically resides in the Flash memory 410 and boot up will execute instructions from the Flash, or firmware. SB 505 may also communicate with the TPM 507 via a LPC bus. It will be understood by one of skill in the art that other hardware architectures, for instance, those using I/O hubs, or memory controllers embedded within the processors, or the like, may be used.

The SEC and PEI phases are shown in box 510. The Authenticated control module (ACM) may be started in this phase 511. The authenticity and measurement of the S-CRTM (Static Core Root of Trust for measurement), or SEC+PEI firmware volume, can be stored in the TPM 507 and may be utilized by the firmware interface table (FIT) 513 referenced StartupACM (Startup Authenticated Code Module), in this phase, as well.

The next phase shown is the DXE (Driver Execution Environment) and BDS (Boot Device Selection) phases 520. In an embodiment, the policy executes in the DXE phase, here. The UEFI TCG measurement 521 is used for the policy engine to authenticate the signed SMM (System Management Mode)/QPI (Quick Path Interconnect) drivers 523. The Secure Boot 525 continues when the measurements and keys match, to ensure that the signed drivers 523 are authenticated before allowing the BDE phase to load the signed UEFI-OS loader and drivers 531. The master boot record (MBR) and Option ROMs 535 would be run at this point for a legacy-OS.

Figure 6:
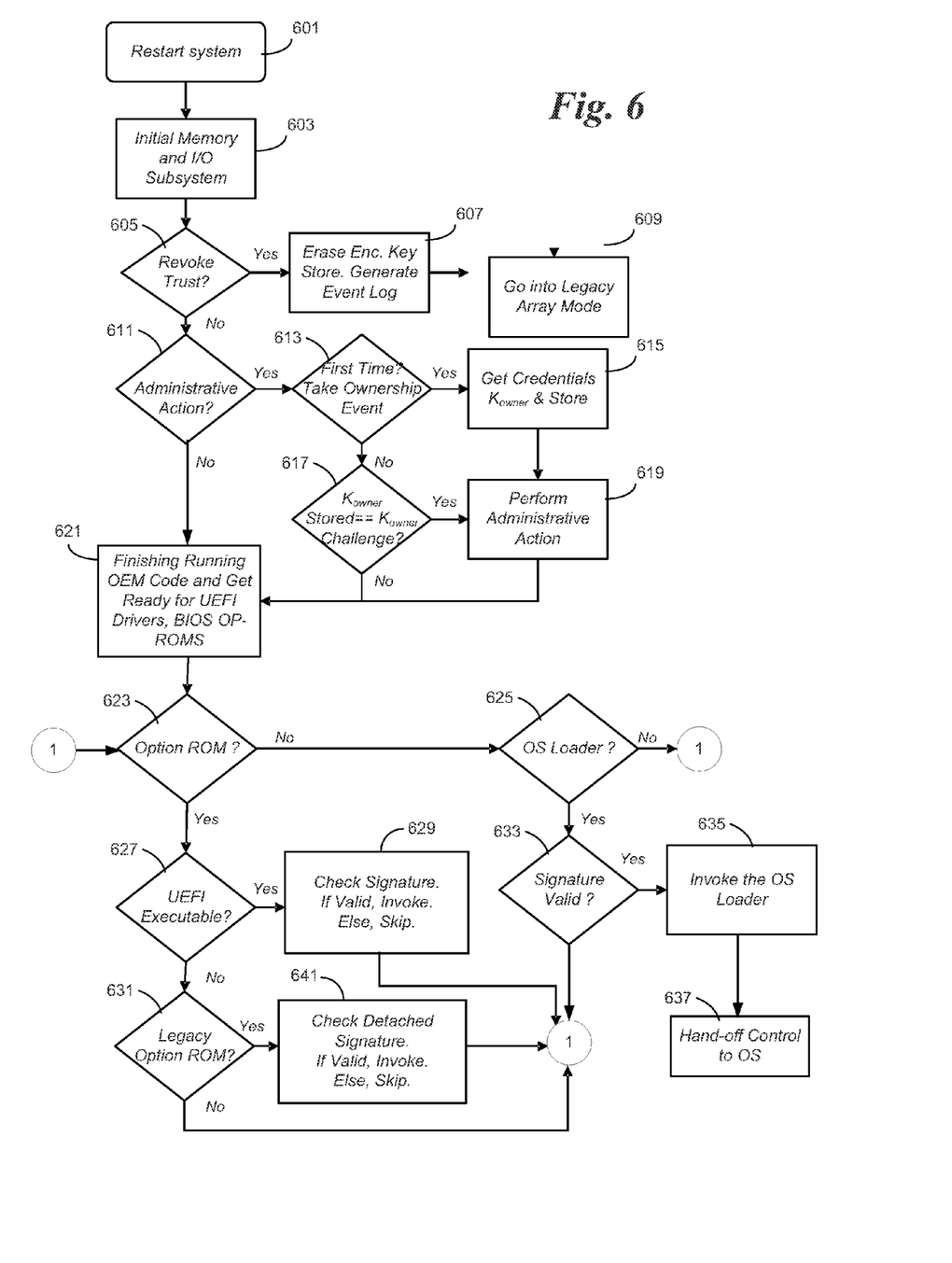
FIG. 6 is a flow diagram showing an exemplary method for booting a platform, according to an embodiment of the invention.

FIG. 6 is a flow diagram showing an exemplary method for booting a platform, according to an embodiment of the invention. The system/platform may be restarted in block 601. The memory and I/O subsystem are initialized in block 603, during the PEI phase. A determination is made in block 605 whether or not to revoke trust. It is possible to remove all policy settings from the certificate database in order to start from scratch. This may be useful for resetting all settings in the system. If it is desired to reset the trust policy settings, then the encryption keys are erased from the database and an event log may be generated, in block 607. The platform may then be booted in legacy mode, in block 609, as if the policy engine did not exist.

If trust is not to be revoked, then it is determined whether an administrative action is to be performed, such as to set platform policy, in block 611. If so, then if this is the first time booting, as determined in block 613, the administrator will take ownership of the platform to setup the credentials in the certificate database. The credentials of the administrator may be required. If will be apparent to one of skill in the art that this may be performed in a variety of ways, for instance, requiring a password, biometric data, smartcard, key fob, etc. Once the credentials are retrieved, a public key for the owner may be entered and stored, in block 615.

If this is not the first time the administrator or owner has booted the platform, the entered credentials are compared with previously stored keys/credentials, in block 617. Once the administrator has been verified, the desired actions may be performed, in block 619.

Once valid administrative actions have been performed, if any, the OEM (original equipment manufacturer) code completes and the platform gets ready for loading UEFI drivers, BIOS Option ROMs, and other $3^{rd}$ party code, in block 621. If the challenge to the administrator fails, the administrative action is invalid, an boot continues at block 621 with the existing platform policy.

Now that any administrative actions are complete, the policy engine may perform authentication on $3^{rd}$ party images and Option ROMs to ensure a secure boot. A determination is as to whether the image is an Option ROM, in block 623. If not, then it is determined whether the image is an OS loader, in block 625. If not, the next image is checked in block 623. If the image is an OS loader, then it is determined whether the signature of the image is valid, in block 633. The policy engine compares the signature of the OS loader to that stored in the certificate database. If there is a match, then the OS loader is invoked, in block 635. If not, processing continues with the next image, in block 623. If no valid OS loader is ever found, then the operating system will fail to boot. A variety of recovery methods may be used.

If the image is not an OS Loader, but is an Option ROM, a determination is made as to whether the image is a UEFI executable, in block 627. If so, then the policy engine checks the image signature against the certificates in the database, in block 629. If the signature is valid, then the image is loaded and invoked. If not, this image is not loaded and processing of the next image is performed in block 623. If the image is from a legacy Option ROM, as determined in block 631, then it may have an embedded signature. This signature is checked. If it is valid, then the image is loaded and invoked, in block 641. Processing then continues to the next image, in block 623.

When all of the Option ROMs have been checked, if a valid OS loader has been invoked, the OS is loaded and the platform completes the boot process. Any images that were not authenticated, for instance due to malware, would have been skipped by the policy engine. Thus, a full complement of drivers may not be loaded, but the platform will be running. The TPM status may note these mismatches in a log, for later administrator action.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for securely booting a platform, comprising:
    a processor coupled to a memory store and communicatively coupled to a trusted platform module component, the trusted platform module to measure each of a plurality of images to be loaded during boot of the platform and to calculate and provide hash values for each of the images to a policy engine executing on the processor, wherein at least one of the plurality of images to be loaded during boot of the platform conforms to a unified extensible firmware interface image format and wherein at least another of the plurality of images to be loaded during boot of the platform conforms to a legacy image format;
    the policy engine communicatively coupled to a certificate database stored in the memory store, wherein the policy engine is configured to authenticate each of the plurality of images to be loaded during boot of the platform based, at least in part, on the hash values, and when an image is not authenticated, the policy engine to prohibit the unauthenticated image from being loaded and launched during boot.

2. The system as recited in claim 1, wherein the certificate database is configured according to a platform policy and comprises a plurality of certificates, each certificate corresponding to one of a plurality of images that is permitted to be loaded during platform boot.

3. The system as recited in claim 2, wherein each certificate in the certificate database is associated with an image authorized to be loaded, and the certificate further comprises a public key, wherein the policy engine is configured to match the public key with an image identifier signature to verify that the image is authorized to be loaded.

4. The system as recited in claim 2, wherein the certificate database comprises:
    a certificate database header; and
    a plurality of certificate lists,
    wherein each certificate list further comprises:
        a certificate list size;
        a certificate count;
        a certificate type;
        a certificate header size;
        a certificate size;
        a certificate header; and
        a plurality of certificates, each certificate having a identifier,
        wherein each certificate corresponds to an image authorized to be loaded on the platform.

5. The system as recited in claim 1, wherein the policy engine is to be executed during a driver execution environment phase of a boot on a platform conforming to unified extensible interface architecture.

6. The system as recited in claim 1, wherein the plurality of images to be loaded includes an operating system loader.

7. The system as recited in claim 6, wherein when the operating system loader is not authorized, the policy engine to prohibit booting of an operating system.

8. The system as recited in claim 1, wherein an image of the plurality of images comprises one of an option-ROM driver and an operating system loader.

9. The system as recited in claim 1, wherein the certificate database is configured to be initialized and updated by an administrator, wherein administrator authority is to be validated prior to allowing administrator action.

10. The system as recited in claim 9, wherein when an administrator removes policy settings from the certificate database, the policy engine is configured to boot the platform in legacy mode and load all images and drivers without further authentication.

11. A method for securely booting a platform, comprising:
    retrieving a plurality of boot images to be loaded during boot the platform, wherein at least one of the plurality of boot images to be loaded during boot of the platform conforms to a unified extensible firmware interface image format and wherein at least another of the plurality of boot images to be loaded during boot of the platform conforms to a legacy image format;
    calculating, by a trust platform module, at least one a hash value for the boot image to be loaded on the platform;
    comparing, by a policy engine, the hash value associated with the boot image with a certificate in a certificate database stored in memory coupled to the platform;
    when the comparison results in a valid match, allowing the boot image to be loaded on the platform during boot; and
    when the comparison results in a failed match, then disallowing the image to be loaded on the platform, during boot, and recording, by a trusted platform manager, said failure and platform status information associated with said failure.

12. The method as recited in claim 11, further comprising executing the policy engine during a driver execution environment phase of boot on the platform, wherein the platform conforms to a unified extensible interface architecture.

13. The method as recited in claim 11, when the image to be loaded is an operating system loader and the comparison to the certificate database fails, prohibiting launch of an operating system on the platform.

14. The method as recited in claim 11, further comprising:
before initiating a full boot of the platform,
validating authority of an administrator; and
configuring the certificate database by initialization or update by the administrator when the administrator has valid authority.

15. The method as recited in claim 14, wherein when the initializing comprises removing policy settings from the certificate database, booting the platform in legacy mode and loading all images and drivers without further authentication.

16. The method as recited in claim 11, further comprising:
configuring the certificate database according to a platform policy, wherein the certificate database comprises a plurality of certificates, each certificate corresponding to one of a plurality of images that is permitted to be loaded during platform boot.

17. The method as recited in claim 16, further comprising matching a public key in a certificate with an image identifier signature to verify that the image is authorized to be loaded,
wherein each certificate in the certificate database is associated with an image authorized to be loaded, and the certificate further comprises a public key.

18. A non-transitory computer readable storage medium having instructions for securely booting a platform stored therein, the instructions when executed on a platform cause the platform to:
retrieve a plurality of boot images to be loaded during boot the platform, wherein at least one of the plurality of boot images to be loaded during boot of the platform conforms to a unified extensible firmware interface image format and wherein at least another of the plurality of boot images to be loaded during boot of the platform conforms to a legacy image format;
calculating, by a trust platform module, at least one a hash value for the boot image to be loaded on the platform;
comparing, by a policy engine, the hash value associated with the boot image with a certificate in a certificate database stored in memory coupled to the platform;
when the comparison results in a valid match, allow the boot image to be loaded on the platform during boot; and
when the comparison results in a failed match, then disallow the image to be loaded on the platform, during boot, and recording, by a trusted platform manager, said failure and platform status information associated with said failure.

19. The medium as recited in claim 18, further comprising instructions to execute the policy engine during a driver execution environment phase of boot on the platform, wherein the platform conforms to a unified extensible interface architecture.

20. The medium as recited in claim 18, when the image to be loaded is an operating system loader and the comparison to the certificate database fails, prohibit launch of an operating system on the platform.

21. The medium as recited in claim 18, further comprising instructions to:
before initiating a full boot of the platform,
validate authority of an administrator; and
configure the certificate database by initialization or update by the administrator when the administrator has valid authority.

22. The medium as recited in claim 21, wherein when the initializing comprises removing policy settings from the certificate database, boot the platform in legacy mode and load all images and drivers without further authentication.

23. The medium as recited in claim 18, further comprising instructions to:
configure the certificate database according to a platform policy, wherein the certificate database comprises a plurality of certificates, each certificate corresponding to one of a plurality of images that is permitted to be loaded during platform boot.

24. The medium as recited in claim 23, further comprising instructions to match a public key in a certificate with an image identifier signature to verify that the image is authorized to be loaded,
wherein each certificate in the certificate database is associated with an image authorized to be loaded, and the certificate further comprises a public key.

* * * * *